June 8, 1954 — S. TATAR — 2,680,428
CRANKSHAFT MOUNTING AND CRANKSHAFT
Filed Jan. 20, 1950 — 2 Sheets-Sheet 1

INVENTOR.
STANLEY TATAR.
BY
ATTORNEY.

June 8, 1954　　　　　　S. TATAR　　　　　　2,680,428
CRANKSHAFT MOUNTING AND CRANKSHAFT
Filed Jan. 20, 1950　　　　　　　　　　　　2 Sheets-Sheet 2
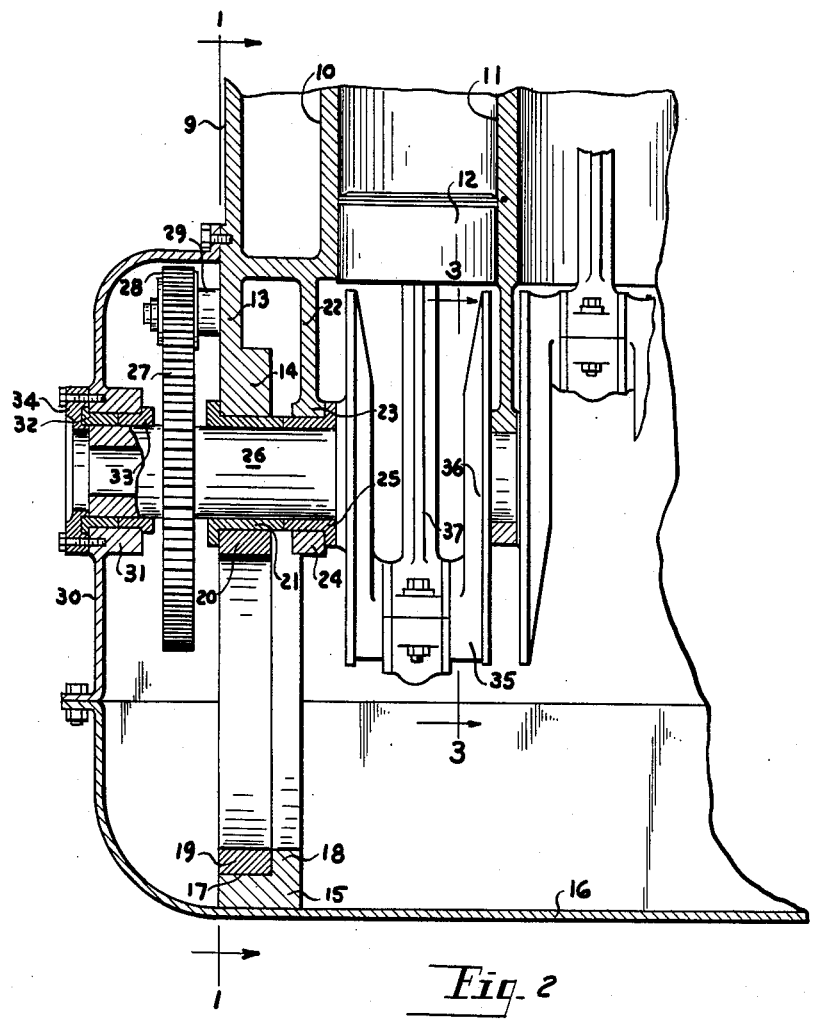
Fig. 2
Fig. 3
INVENTOR.
STANLEY TATAR.
BY
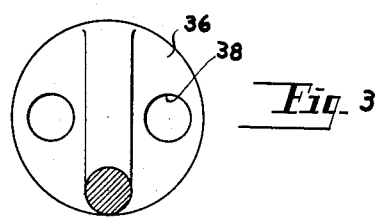
ATTORNEY.

Patented June 8, 1954

2,680,428

UNITED STATES PATENT OFFICE 2,680,428

CRANKSHAFT MOUNTING AND CRANKSHAFT

Stanley Tatar, Detroit, Mich.

Application January 20, 1950, Serial No. 139,699

2 Claims. (Cl. 121—194)

My invention relates to a new and useful improvement in a crankshaft mounting and the crankshaft adapted for use on internal combustion engines.

It is an object of the present invention to provide a crankshaft mounting whereby the crankshaft will have a more secure bearing with the result that it will be held more rigid and, in its rotation, run true on its center thus avoiding vibrations and other objectionable features which result from the conventional type of mounting a crankshaft.

Another object of the invention is the provision of a crankshaft mounting in which the thrust of the shaft will be transmitted to a maximum area of the engine so as to relieve any localized point from excessive strain.

Another object of the invention is the provision of a crankshaft so arranged, constructed and mounted that a smooth operation of the engine may be effected.

Another object of the invention is the provision of a crankshaft having the cranks with arms formed as circular members to properly balance the crankshaft in its operation and eliminate torsional vibration.

Other objects will appear hereinafter.

It is recognized that various modifications and changes may be made in detail of the structure illustrated and it is to be understood that the illustration herein is but the preferred embodiment of the invention.

Forming a part of this specification are drawings in which,

Fig. 2 is a fragmentary view taken on line 2—2 of Fig. 1.

Fig. 3 is a view taken on line 3—3 of Fig. 2 slightly reduced in size.

Figure 1:
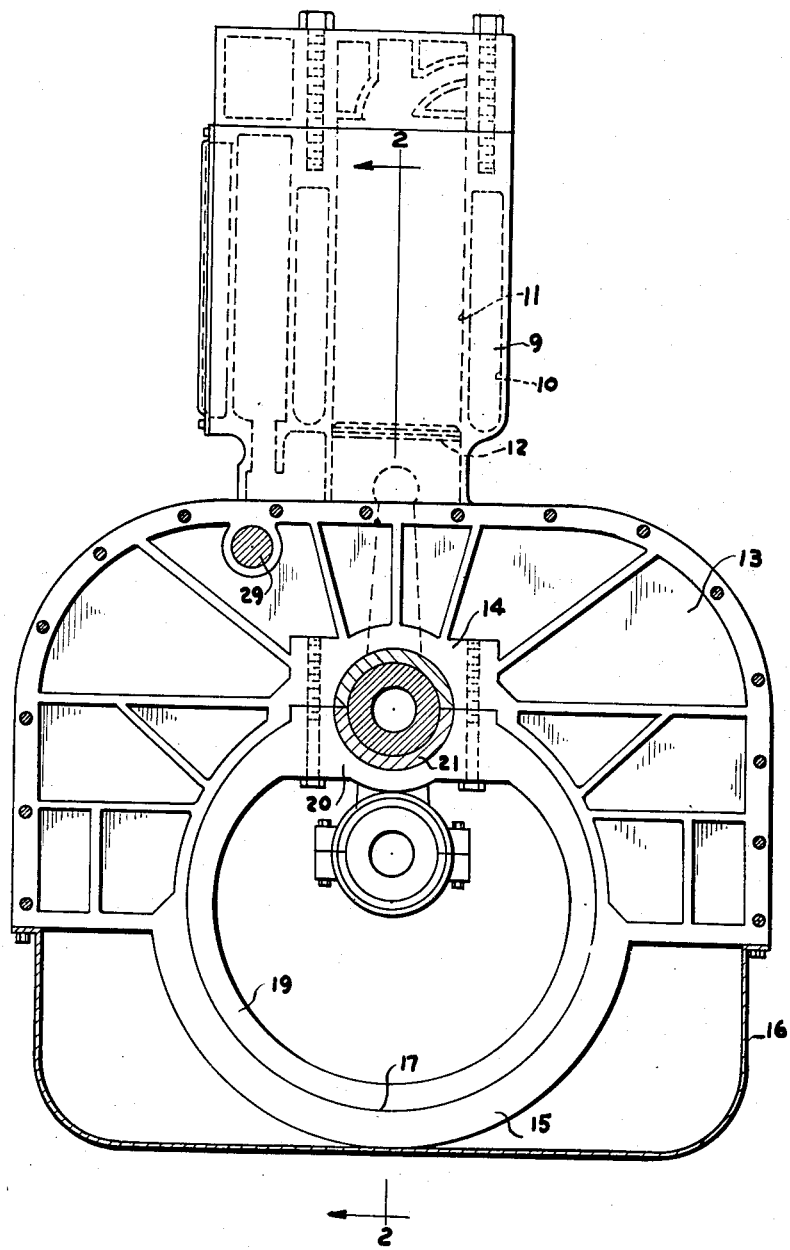
Fig. 1 is a sectional view of the invention from the front and taken on line 1—1 of Fig. 2.

In the drawings I have illustrated an engine block 9 having the water compartment 10 for the purpose of cooling the cylinders 11 in which is a reciprocating piston 12. Forming a part of and projecting downwardly from this block 9 is a plate 13 and formed on which is the bearing pillow 14. An annulus is formed on the member 13 and completing this annulus is the arcuate portion 15 which projects downwardly from the lower edge of the plate 13 centrally thereof. Secured to and positioned below the engine block is the crankcase drain pan 16. This annular member 15 is, as shown in Fig. 2, cut away as at 17 to provide an inner flange 18, the member 15 serving as a rim. Resting on the inner face of this rim 15 is the circular member 19 carrying at its upper end the pillow block 20 which is secured to the pillow 14 to form a bearing. Positioned in this bearing thus formed is a bushing 21 which is in alignment with the bushing 25 supported by the bearing sections 23 and 24 which are carried by the rim or plate 22 projecting downwardly from the engine block. Journaled in these is one end of a crankshaft 26 on which is fixedly mounted a gear 27 meshing with a gear 28 mounted on the stub shaft 29 which projects outwardly from the member 13 adjacent the upper end thereof, these gears serving as conventional timing gears.

A front cover 30 is secured to the drain pan 16 and the plate 13 by suitable bolts and is provided with a hub 31 in which are positioned the bushings 32 and 33 which serve as a bearing for the end of the crankshaft 26. A cover plate 34 is mounted on the hub 31 and serves to retain the bushings 32 in position. The crankshaft is provided with the crank 35 and the arms 36 of which are formed circular as fully shown in Fig. 3 and provided with the openings 38. A connecting rod 37 serves to connect the crank 35 with the piston 12. It is, of course, understood that there will be a plurality of cranks on this crankshaft as the crankshaft is intended for use with a multi-cylinder internal combustion engine.

With this form of mounting of the crankshaft it is believed obvious that the thrust of the crankshaft will be transmitted thru the member 19 to the member 15 so as to be distributed over a large area. In use the form of construction described has shown that some displacements of the crankshaft during its operation are eliminated and a durable smooth running structure is thus provided. With this type of mounting and the type of crankshaft illustrated the tortional vibrations are also reduced thus increasing the efficiency of the engine itself.

What I claim is:

1. In combination, an internal combustion engine cylinder block; a plate on the forward end of said block; an arcuate extension projecting downwardly from the central portion of the lower edge of said plate; a pillow block on said plate at the upper central portion of said recess; an annular supporting member positioned in the said extension and bearing against the same throughout the length thereof and extending upwardly into a recess formed in said extension at the central portion thereof; and a pillow block on the upper central portion of said annular member secured to said first named pillow block to form a bearing.

2. In an internal combustion engine, a cylinder block; a plate on the forward end of said block; an arcuate extension projecting downwardly from the central portion of the lower edge of said plate; there being formed inwardly of the lower edge of said plate at the central portion thereof, a recess; a pillow block on said plate at the upper central portion of said recess; an annular supporting member positioned in said extension and bearing against the face of same throughout the length thereof and extending upwardly into said recess and bearing against said plate at the recessed portion; a pillow block at the upper central portion of said annular member, secured to said first named pillow block to form a bearing.

References Cited in the file of this patent

UNITED STATES PATENTS

| Number | Name | Date |
|---|---|---|
| 673,308 | Walrath | Apr. 30, 1901 |
| 1,026,849 | Coffin | May 21, 1912 |
| 1,759,147 | Vincent | May 20, 1930 |
| 1,864,004 | Stevens | June 21, 1932 |
| 2,209,542 | Ryder | July 30, 1940 |
| 2,252,480 | Boulet | Aug. 12, 1941 |
| 2,340,885 | Kinnucan | Feb. 8, 1944 |
| 2,371,797 | Brill | Mar. 20, 1945 |

FOREIGN PATENTS

| Number | Country | Date |
|---|---|---|
| 58,096 | Denmark | Oct. 21, 1940 |